Nov. 17, 1970 W. A. AYRES 3,541,233
COLOR CONVERSION SYSTEM FOR X-RAYS
Filed July 6, 1967
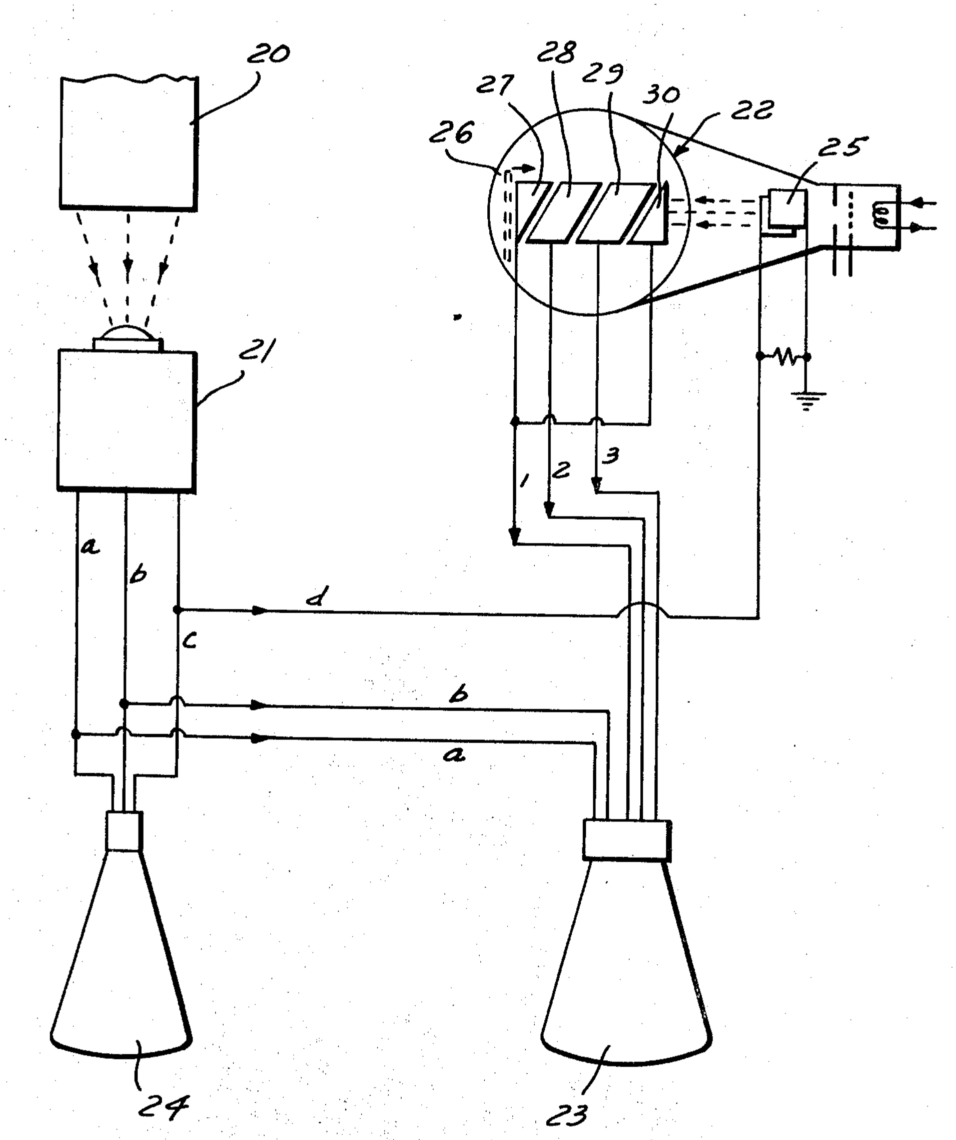
INVENTOR
WALDEMAR A. AYRES
BY
Kane, Dalsimer, Kane, Sullivan & Smith
ATTORNEYS United States Patent Office 3,541,233
Patented Nov. 17, 1970

3,541,233

COLOR CONVERSION SYSTEM FOR X-RAYS

Waldemar A. Ayres, Rutherford, N.J., assignor to Becton, Dickinson and Company, East Rutherford, N.J., a corporation of New Jersey Filed July 6, 1967, Ser. No. 651,473
Int. Cl. H04n 5/32
U.S. Cl. 178—5.2 4 Claims

ABSTRACT OF THE DISCLOSURE

A system for converting two and three dimensional X-rays from black and white into color by assigning different colors to different shades of gray in the black and white image thereby increasing the contrast between portions of the image and facilitating viewing of the X-ray. An X-ray image is projected and picked up by a television camera which in turn is connected to both a color conversion control tube and a color television tube which are in turn connected to each other so that the conversion tube is responsive to the gray scale of the image and controls the color guns of the TV tube in response to the gray scale thereby converting the various grays of the image into colors to be viewed on the colored TV tube. A manual control knob may be provided on the color conversion tube to allow the observer to manually shift the color spectrum relative to the gray values in a particular X-ray picture to obtain an optimum color contrast. In addition, the black and white TV tube may be additionally hooked up to the intensifier so that a black and white image and a colored image are shown simultaneously.

BACKGROUND OF THE INVENTION

In the field of X-ray technology, using both two dimensional pictures and three dimensional pictures, with the normal black and white picture received it is often difficult for the observer to clearly define between various objects and portions within the body. The interior of the object appears in various shades of gray which are not easily discernible to the human eye. There have been various recent developments in the X-ray and fluoroscope art which have particularly developed the brightness and clarity of the image received. However, there is still much that can be done to improve the contrasts between the portions of the picture to further aid the visibility of the observers.

It would be particularly advantageous if the gray scale of light values of the picture could be transposed into a color scale. It would be extremely valuable because tests have shown that our eyes can differentiate better between shades of color than between shades of gray. Since X-rays have no color of their own, arbitrary colors could be used for different portions of the X-ray, as we do in map work to aid differentiation. In addition, it would be also useful to have a manually adjustable color control knob which may be used to shift the color range while studying a particular object to make use of colors of greatest contrast.

This type of system would be particularly useful in medical diagnosis, where studies of body structure, functions and the results of therapy are closely and meticulously studied. In addition, such an improvement could be useful also in industrial X-ray fields where studies are made of flaws in castings and assembly alignment in finished products is made.

In the systems in use in medical diagnosis today, the X-ray pictures have been intensified and brightened to a considerable extent but additional improvement in the intelligibility of the X-ray picture is still worthwhile. As stated before, in the field of color science, it has been tested and established that given brightness differences in the gray scale become more detectable in the color scale. This is shown, for example, by much greater effectiveness of color illustrations in magazines, as compared with black and white and also in color movies and color television.

It would be additionally desirable to use image intensification to improve the X-ray image before assigning a color scale to the image to arrive at the most optimum result.

SUMMARY OF THE INVENTION

This invention provides a color conversion system for converting two dimensional and three dimensional X-rays into colored images. The system includes means for producing an X-ray image of any object, a television camera aligned with the image so as to receive it, color conversion control means connected to the television camera and being responsive to the gray scale of the image received by the camera and a color television tube connected to both the television camera and the color conversion control tube in a manner so that when the conversion tube responds to the gray scale of the black and white X-ray image it will activate the color guns of the TV tube to produce a colored reproduction of the X-ray picture on the screen of the color television tube.

The assigned colors do not correspond to the actual colors within the object if there are any but are merely assigned colors by the system to produce contrast between portions of the image. A manual control may be part of the conversion tube so that the color spectrum may be adjusted to assign colors of greatest contrast to the various portions of the picture thereby facilitating the viewing by the observer.

The principal objects of this invention are to provide an improved system for obtaining and observing an X-ray image in either two dimensional or three dimensional form by intensifying the image and then assigning a color spectrum to the gray scale of the X-ray picture to finally arrive at an easily readable and observable colored reproduction of the X-ray image or picture and to provide a method for converting a black and white X-ray image into a colored image to facilitate the observation and study of the object being X-rayed.

Numerous other objects and advantages will become apparent from the following detailed description which is to be taken in conjunction with the accompanying drawing illustrating a somewhat preferred embodiment of the invention.

BRIEF DESCRIPTION OF THE DRAWING

The drawing is a schematic representation of the various elements embodying a color conversion system of this invention and how they are connected with arrows depicting the direction of flow within the system.

DESCRIPTION OF THE PREFERRED EMBODIMENT

Referring to the drawing, the basic elements of the system in sequence include an image intensifier 20, a television camera 21, a color conversion control tube 22 and a color TV tube 23. In addition, a normal black and white television tube 24 is also depicted for explanatory reasons. The means for obtaining the X-ray picture either in two dimensional or three dimensional form is not shown mainly because there are many ways well known in the art to obtain an image or picture which is adaptable for use with this system. Also, principally for purposes of clarity, the systems diagram and description includes both black and white and color image presentation. This is particularly to show how the color conversion ties into the already developed television technology. All of the elements 20–24 are commercial components which are readily obtainable in the commercial market and are all well known in the art. For this reason, they are depicted in schematic form.

In action operation, the X-ray intensifier 20 picks up the relatively faint X-ray image and intensifies it greatly to a visible image on a screen. Then, a television camera 21 which is in alignment with the image on the screen picks up the visible image delvered by intensifier 20.

In connecting the various elements in operational arrangement, the following has been found to be acceptable however, other arrangements are possible. The horizontal scan or sweep voltage of camera 21 is connected to both the black and white television tube 24 and the colored television tube 23. This connection is designated as A in the accompanying figure. Likewise the vertical sweep voltage of camera 21 is connected to both TV tubes 23 and 24 with the connection in the accompanying drawing being designated as B. This enables camera 21 and both TV tubes 23 and 24 to work in synchronism at all times.

However, while the spot brightness control of camera 21 is connected directly to black and white TV tube 24, designated as connection C, it is also connected to the horizontal deflection plates 25 of color conversion control tube 22. This connection is designated as connection D in the accompanying drawing.

Conversion tube 22 has an electronic beam 26 which is not a round spot but instead a tall thin band in cross-section. As the deflection voltage increases, this electron beam 26 sweeps toward the right a distance proportional to the brightness of the X-ray image being scanned at a particular moment of time. The electrons of the beam 26 will fall on one or two electrically conductive target segments located where the beam happens to be and no where else. These segments are designated in the drawing as portions 27–30 respectively. This will activate the segments only, and in proportion to the areas of the segments immediately under the beam. These four segments 27–30 will provide infinitely variable proportions and combinations of the three light colored primaries, which will provide the full color spectrum to the observer.

The output leads of color conversion control tube 22 are connected to the brightness controls of the three color guns of color television tube 23. As is shown in the drawing, segments 27 and 30 are connected to one color gun as designated as connection 1. Segment 28 is connected to a second color gun as is designated by connection 2 and segment 29 is connected to the third color gun as designated by connection 3. In this manner, the circuit is completed.

In addition to the above mentioned arrangement, a knob control may be provided for manual adjustment of the amplifier for the sweep deflection voltage controlling the electron beam 26. In this manner, the observer is able to manually shift the color spectrum relative to the gray value in a particular X-ray picture. This could be quite useful in obtaining an optimum color contrast when studying a particular object. In addition, how the colors change with such shifting may provide additional information to the observer in certain instances.

In addition, this system may also be adapted for use with X-ray films. The films would be back lighted and would be substituted in the system where intensifier 20 is located with the resultant image being again converted to color by the remainder of the system.

Thus, the aforenoted objects and advantages are most effectively attained. Although a single somewhat preferred embodiment of the invention has been disclosed and described in detail herein, it should be understood that this invention is in no sense limited thereby and its scope is to be determined by that of the appended claims.

I claim:

1. A color conversion system for X-rays comprising means for producing and projecting an X-ray image of an object, a television camera aligned with said means so as to receive said projected image from said producing and projecting means, color conversion control means connected to said television camera and responsive to the gray scale of the image being received, a color television tube connected to said television camera and said color control means so that the response of said color conversion control means to said gray scale activates an electronic color image producing device to transform the black and white image to a colored image with the color of each part of said colored image determined by the shade of gray of each part of said black and white image respectively, the horizontal sweep voltage and the vertical sweep voltage of said television camera being connected to said color television tube and the spot brightness control being connected to said color conversion control tube, said color conversion control tube including an electronic beam movably responsive to said spot brightness control and electrically conductive target segments positioned so that said electronic beam contacts different portions thereof as it moves in response to said spot brightness control, said segments being connected to the electronic color image producing device of the color television tube so that the colors of the final colored image is determined by the position of said electronic beam on said segments.

2. A color conversion system for X-rays comprising means for producing and projecting an X-ray image of an object, a television camera aligned with said means so as to receive said projected image from said producing and projecting means, color conversion control means connected to said television camera and responsive to the gray scale of the image being received, a color television tube connected to said television camera and said color control means so that the response of said color conversion control means to said gray scale activates an electronic color image producing device to transform the black and white image to a color image with the color of each part of said colored image determined by the shade of gray of each part of said black and white image respectively, the horizontal sweep voltage and the vertical sweep voltage of said television camera being connected to said color television tube and the spot brightness control being connected to said color conversion control tube, said color conversion control tube including an electronic beam movably responsive to said spot brightness control and electrically conductive target segments positioned so that said electronic beam contacts different portions thereof as it moves in response to said spot brightness control, said segments being connected to the electronic color image producing device of the color television tube so that the colors of the final colored image is determined by the position of said electronic beam on said segments, said segments including four aligned segments with the two end segments being connected to one of three primary color guns of the colored television tube and each of the other two segments being connected to each of the other two color guns respectively, said segments being shaped so that the electronic beam may contact any one segment alone or any two adjacent segments thereby enabling a variety of different color combinations to be obtained.

3. A color conversion system for X-rays comprising means for producing and projecting an X-ray image of an object, a television camera aligned with said means so as to receive said projected image from said producing and projecting means, color conversion control means connected to said television camera and responsive to the gray scale of the image being received, a color television tube connected to said television camera and said color control means so that the response of said color conversion control means to said gray scale activates an electronic color image producing device to transform the black and white image to a colored image with the color of each part of said colored image determined by the shade of gray of each part of said black and white image respectively, the horizontal sweep voltage and the vertical sweep voltage of said television camera being connected to said color television tube and the spot brightness control being connected to said color conversion control tube, said color conversion control tube including an electronic beam movably responsive to said spot brightness control and electrically conductive target segments positioned so that said electronic beam contacts different portions thereof as it moves in response to said spot brightness control, said segments being connected to the electronic color image producing device of the color television tube so that the colors of the final colored image is determined by the position of said electronic beam on said segments, a knob control being provided on said color conversion control tube for manually shifting the position of said electronic beam in relation to said segments thereby allowing the color spectrum to be manually shifted relative to the gray values to facilitate the obtaining of optimum color contrast.

4. A method of converting a black and white X-ray image into a colored image by employing means for producing an X-ray image of an object, a television camera to receive said image, a color conversion control tube and a color television tube comprising; locating the television camera so that it receives the X-ray image from said means, connecting the color conversion control tube and the color television tube to said camera and to each other so that the black and white images are converted into a color image and is visible on said color television tube, said color conversion control tube including an electronic beam movably responsive to the spot brightness control of said camera and electrically conductive target segments positioned so that said electronic beam contacts different portions thereof as it moves in response to the spot brightness control, said segments being connected to the color guns of the color television tubes so that the colors of the final colored image is determined by the position of said electronic beam on said segments.

References Cited

UNITED STATES PATENTS

| | | | |
|---|---|---|---|
| 2,593,925 | 4/1952 | Sheldon. | |
| 2,730,566 | 1/1956 | Bartow et al. | 178—5.4 |
| 3,229,089 | 1/1966 | Sasao | 178—5.2 |
| 3,280,253 | 10/1966 | McMaster et al. | |

ROBERT L. GRIFFIN, Primary Examiner

R. P. LANGE, Assistant Examiner

U.S. Cl. X.R.

178—6, 54